United States Patent [19]

Eppler, Jr. et al.

[11] 4,417,103

[45] Nov. 22, 1983

[54] STEREO REPRODUCTION WITH GAPLESS SPLICING OF PITCH ALTERED WAVEFORMS

[75] Inventors: William G. Eppler, Jr., Norwalk, Conn.; Michael A. Klasco, New York; Irwin H. Kornfeld, Brooklyn, both of N.Y.

[73] Assignee: The Variable Speech Control Company ("VSC"), San Francisco, Calif.

[21] Appl. No.: 462,230

[22] Filed: Jan. 31, 1983

Related U.S. Application Data

[63] Continuation-in-part of Ser. No. 262,046, May 11, 1981.

[51] Int. Cl.³ .......................... G10L 1/00; G11B 31/00
[52] U.S. Cl. ......................................... 369/60; 369/88; 360/8
[58] Field of Search ................ 179/15.55 T, 15.55 R, 179/1.5 M, 1.5 H; 360/8, 108, 30; 358/127, 144, 138; 365/227

[56] References Cited

U.S. PATENT DOCUMENTS

| | | | |
|---|---|---|---|
| 3,949,174 | 4/1976 | Sutton | 179/1.5 H |
| 4,079,197 | 3/1978 | Furcher | 179/1.5 H |
| 4,091,242 | 5/1978 | Carubba et al. | 179/15.55 T |
| 4,121,058 | 10/1978 | Jusko et al. | 179/15.55 T |
| 4,210,781 | 7/1980 | Nishimura et al. | 179/15.55 T |
| 4,241,235 | 12/1980 | McCanney | 179/1.5 H |

*Primary Examiner*—Emanuel S. Kemeny
*Attorney, Agent, or Firm*—Charles E. Pfund

[57] ABSTRACT

A time compression audio reproduction system has two stereo channels with means for synchronously operating the pitch correction means in each channel to obtain time coincidence between corresponding portions of the signal output from each channel. Features include switching for alternately selecting delay elements.

8 Claims, 13 Drawing Figures

4,417,103

STEREO REPRODUCTION WITH GAPLESS SPLICING OF PITCH ALTERED WAVEFORMS

CROSS-REFERENCE TO RELATED APPLICATION

This application is a continuation-in-part of copending Ser. No. 262,046 filed May 11, 1981.

BACKGROUND OF THE INVENTION

This invention relates to stereophonic audio reproduction systems and particularly to obtaining pitch altered reproduction of stereo audio signals. The referenced copending application describes improved systems for pitch altered reproduction and the present invention extends those concepts to obtain high quality stereo reproduction.

SUMMARY OF THE INVENTION

Dual audio channels of the type disclosed in the referenced copending application are synchronized and controlled for pitch alteration to produce stereo reproduction that maintains fixed virtual sound locations and amplitude levels with gapless and noise free continuous audio output.

DESCRIPTION OF THE DRAWINGS

Referring now to the drawings, FIGS. 1, 2, 3, 4 and 5 assembled as indicated in FIG. 6, show the overall system of the invention of the referenced copending application for audio signal processing with a single band channel.

FIGS. 1-5 are arranged to represent a complete system.

DETAILED DESCRIPTION OF THE PREFERRED EMBODIMENT

Figure 1:
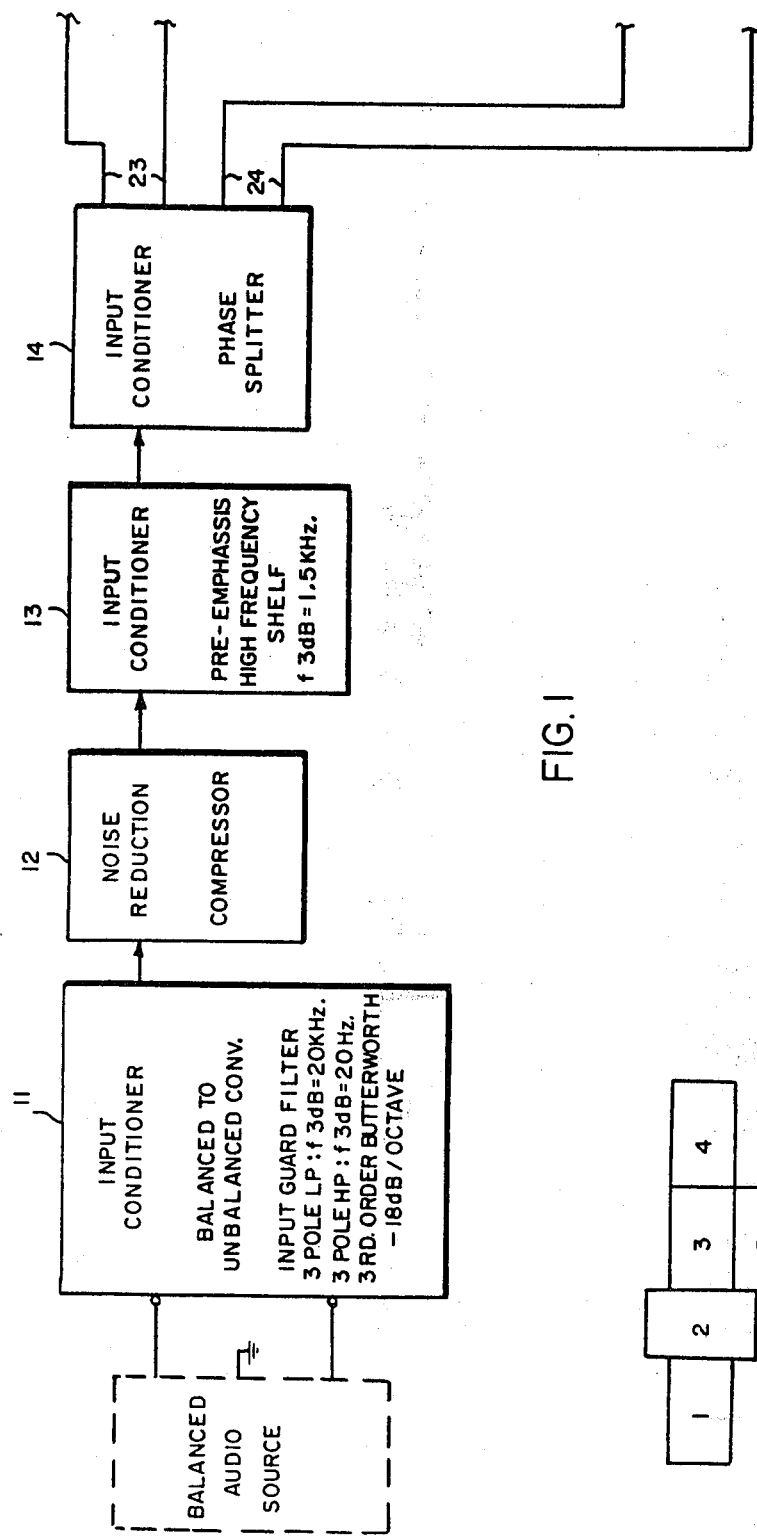
FIG. 1 shows the input portion of the system with guard filters and noise reduction compressor for conditioning audio signals for pitch correction.
Figure 6:
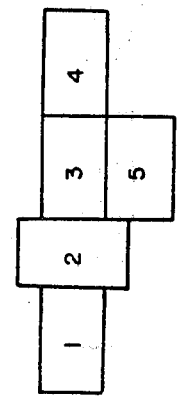
FIG. 6 shows how

Referring now to FIG. 1, the input section is shown as comprising an input conditioner 11 adapted to receive the balanced input signal from any conventional audio signal source which signal is converted to unbalanced with respect to ground for processing through the disclosed system. The conditioner 11 also includes an input guard filter which typically limits the audio signals to a band from 20 Hz to 20 kHz.

The unbalanced audio signal within the frequency range of 20 Hz to 20 kHz is applied to the compressor portion 12 of a compander for noise reduction in accordance with conventional practice. The signal from compressor 12 is applied to a pre-emphasis high frequency shelf 13 which provides gain emphasis for the higher frequency components above 1.5 kHz. The conditioned audio signal from pre-emphasis 13 is applied to a phase splitter 14, the output of which is two pair of phase opposed versions of the audio signal for application to the pitch shifter delay means employed herein, as will be described.

Figure 2:
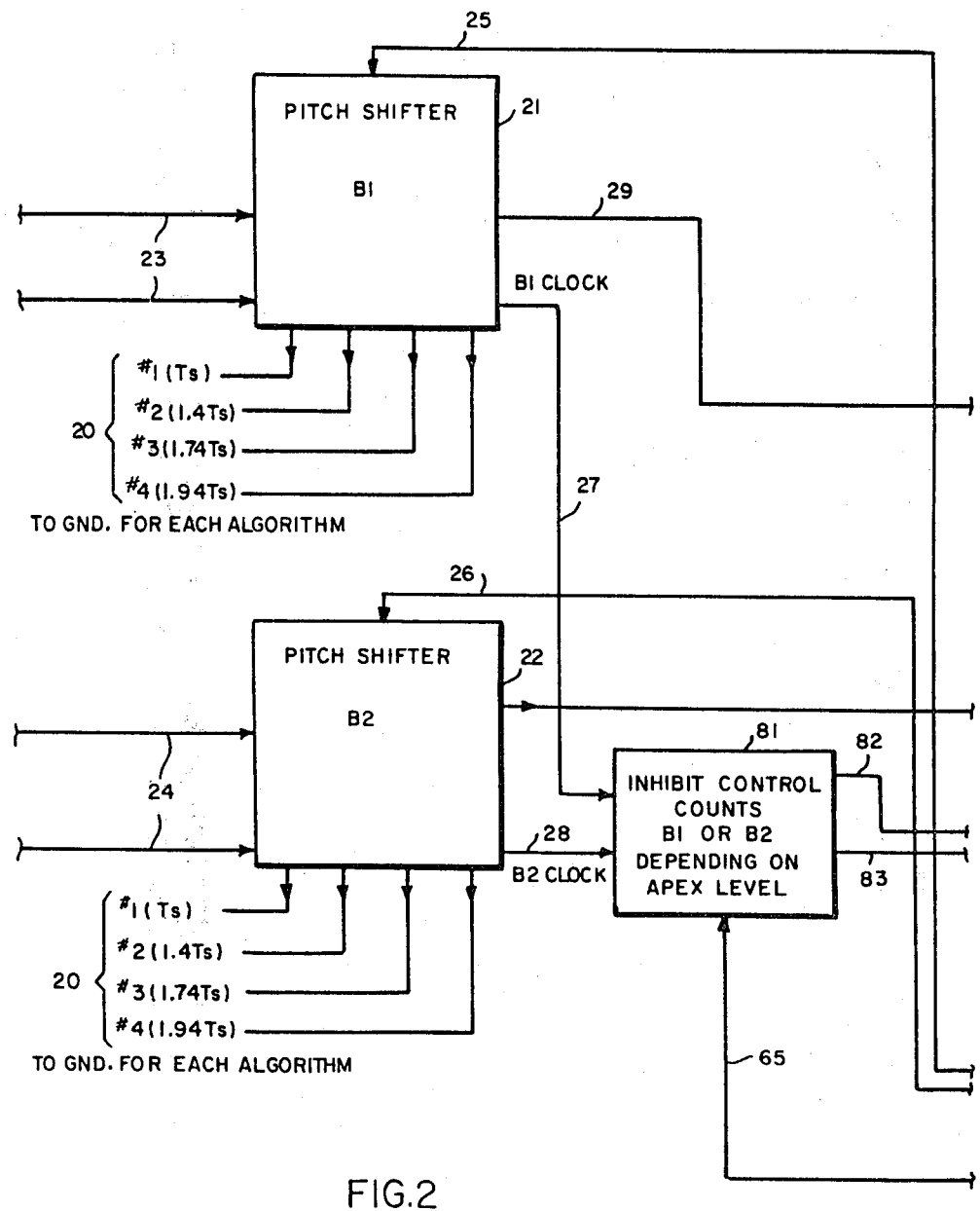
FIG. 2 is a block diagram of a pair of pitch shifters which are operated under control of the system and an inhibit control.

Referring to FIG. 2, the pitch shifters employed in the present invention may comprise matched pairs of bucket brigade analog shift registers in a first pitch shifter 21 and a second pitch shifter 22. Pitch shifter 21 receives phase opposed audio input signals on lines 23 while pitch shifter 22 receives phase opposed audio signals on line 24. Pitch shifter 21 receives a triangular control signal at line 25 and pitch shifter 22 receives a phase opposed triangular control signal on line 26. The pitch shifters 21 and 22 each contain ramp voltage-to-pulse period conversion circuits and a pair of bucket brigade shift registers to provide the variable delay required for pitch modification. Details of these techniques are disclosed, for exammple, in the patent to Schiffman U.S. Pat. No. 3,840,814, which shows voltage ramp-to-pulse period conversion and in the patents to Schiffman U.S. Pat. Nos. 3,828,361 and 3,906,384 which show signal processing through bucket brigade shift registers with phase inverted inputs for cancellation of processing noise and distortion.

The relation among the parameters for a typical example could be obtained from the following relations:

SAMPLE CALCULATION $$Ts = \frac{C+1}{2(c-1)} \left[ \frac{1}{fmin} - \frac{1}{fmas} \right] \frac{N}{2}$$

$C$ = SPEED Up: $C = 1$ NORMAL SPEED: let $C = 1.2$ $N$ = Number of buckets in BBD: $N = 4096$ $fmin$ = lowest clock frequency: $fmin = 95.6\text{kHz}$ $fmax$ = highest clock frequency: $fmax = 748.4\text{kHz}$ $Ts$ = segment time = $\frac{C+1}{2(C-1)}$ $$Ts = \frac{1.2+1}{2(1.2-1)} \left[ \frac{1}{95.6\text{kHz}} - \frac{1}{748.4\text{kHZ}} \right] \frac{4096}{2}$$

$Ts = 103$ msec

Since: $Ts = Td + Tc$

-continued
SAMPLE CALCULATION $$Td(\text{discard}) = \frac{C+1}{2C}\left[\frac{1}{f\text{min}} - \frac{1}{f\text{max}}\right]\frac{N}{2}$$

$$Td = \frac{1.2 + 1}{(2)(1.2)}\left[\frac{1}{95.6\text{kHz}} - \frac{1}{748.4\text{kHZ}}\right]\frac{4096}{2}$$

$Td = 17.2$ msec

Hence the "keep" sample is:

$$Tc(\text{KEEP}) = \frac{C+1}{2C(C-1)}\left[\frac{1}{f\text{min}} - \frac{1}{f\text{max}}\right]\frac{N}{2}$$

$$Tc = \frac{1.2+1}{(2)(1.2)(1.2-1)}\left[\frac{1}{95.6\text{kHz}} - \frac{1}{748.4\text{kHz}}\right]\frac{4096}{2}$$

$Tc = 85.8$ msec

Clock pulses representing the clocking of the respective shift registers in pitch shifters 21 and 22 are available on ouput lines 27 and 28, while the pitch shifted audio output signals appear at lines 29 and 30 respectively. Each of the pitch shifters 21 and 22 has a set of segment time control inputs 20 which are coordinated with the rate of change of pulse period to optimize the parameters of the pitch correction processing with the audio message content.

Figure 3:
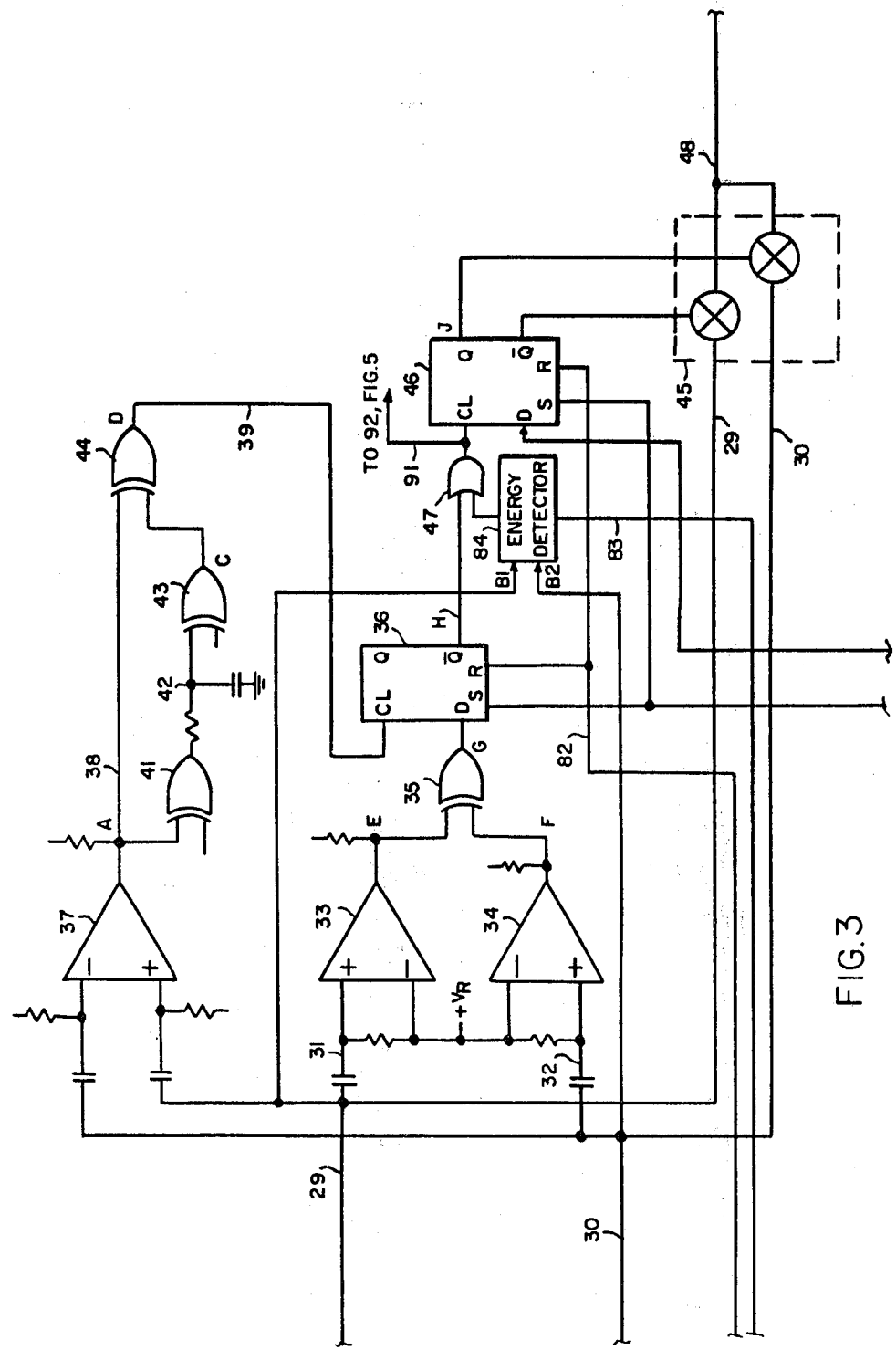
FIG. 3 is a slope amplitude wave-matching system for the signals received from the pitch shifters of FIG. 2.

The audio waveforms on lines 29 and 30 are compared as to slope direction and amplitude in the circuit of FIG. 3 for the purpose of detecting and implementing wave matching before these audio signals are spliced at a selected point where their amplitudes are equal and their slopes are of the same sign. For this purpose, slope direction is determined for each audio signal by a pair of differentiators 31, 32, which apply the differentiated audio signals to same polarity inputs of comparators 33, 34. The other inputs of comparators 33, 34, are at the same reference voltage $V_R$. The outputs E and F of comparators 33, 34 are applied as inputs to an exclusive OR 35 which produces a transition output G any time the outputs of comparators 33, 34, change to be the same. A D-flip-flop 36 receives on its D input the output of exclusive OR 35.

Amplitude comparison is obtained by applying the audio inputs from lines 29 and 30 to the opposite polarity inputs of an amplitude comparator 37. Whenever the two inputs to comparator 37 are equal in amplitude an output transition A occurs on line 38. The positive and negative transitions on line 38 are converted into positive transitions D on line 39 for each such transition by means of the circuit shown which comprises an inverter 41, delay circuit 42 and an inverter 43. The output from inverter 43 and the signal on line 38 are applied to exclusive OR 44 which produces an output wave D (FIG. 8) which represents each transition on line 38 but converted on line 39 to be a low to high transition which is applied to the clock input of D-flip-flop 36.

The D-flip-flop 36 with its data and clock input signals now is conditioned with amplitude equality and slope direction equality which will cause a transition at line H from the $\overline{Q}$ output signifying a match point between the audio signals on lines 29 and 30. This transition is used to control a splicing switcher 45 controlled by the Q and $\overline{Q}$ outputs of a D-flip-flop 46 operated by a number of control signals to be subsequently described. For this purpose the wave H on $\overline{Q}$ of FF36 is applied to the clock input of the second D-flip-flop 46 through an OR 47. The Q and $\overline{Q}$ outputs of D-flip-flop 46 are applied to switch 45 to connect either one, but not both, of the audio signals on lines 29 and 30 to output terminal 48. The timing and control function for this switching will be described hereinafter in relation to the control of the dual pitch correction devices, particularly with reference to the waveforms of FIG. 8.

Figure 4:
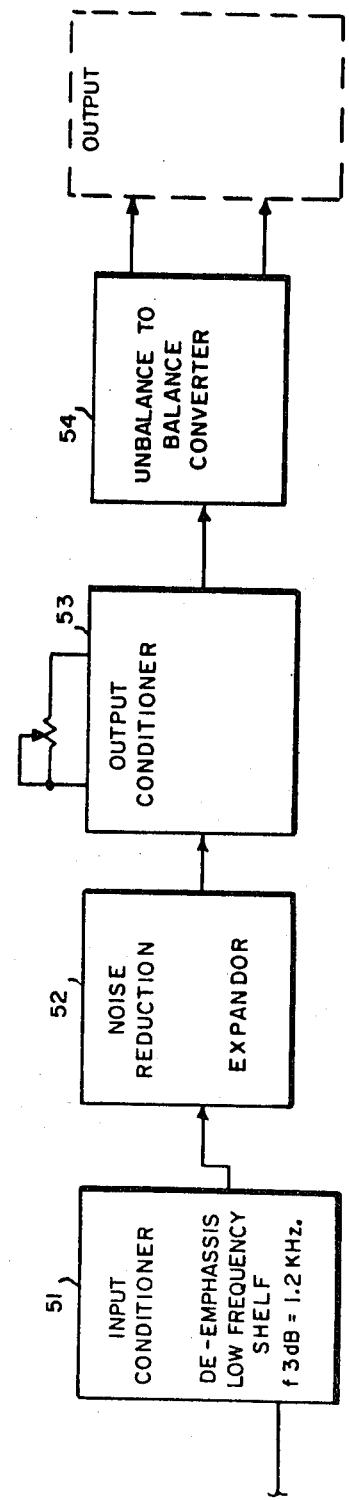
FIG. 4 is a block diagram of the output system for noise reduction and signal conditioning complementary to the input section of FIG. 1.

The spliced audio output signal on terminal 48 is applied to the noise reduction and signal conditioning output circuitry of FIG. 4 which includes a de-emphasis low frequency shelf 51 and then to expandor 52. These units are the complementary corresponding units to the compressor 12 and pre-emphasis high frequency shelf 13 of FIG. 1. The output of expander 52 is amplified in amplifier unit 53 and converted to a balanced signal in the unbalanced to balanced converter 54 which provides to any output device a balanced output signal consisting of the spliced, pitch corrected signal free of splicing noise in accordance with the invention.

Figure 5:
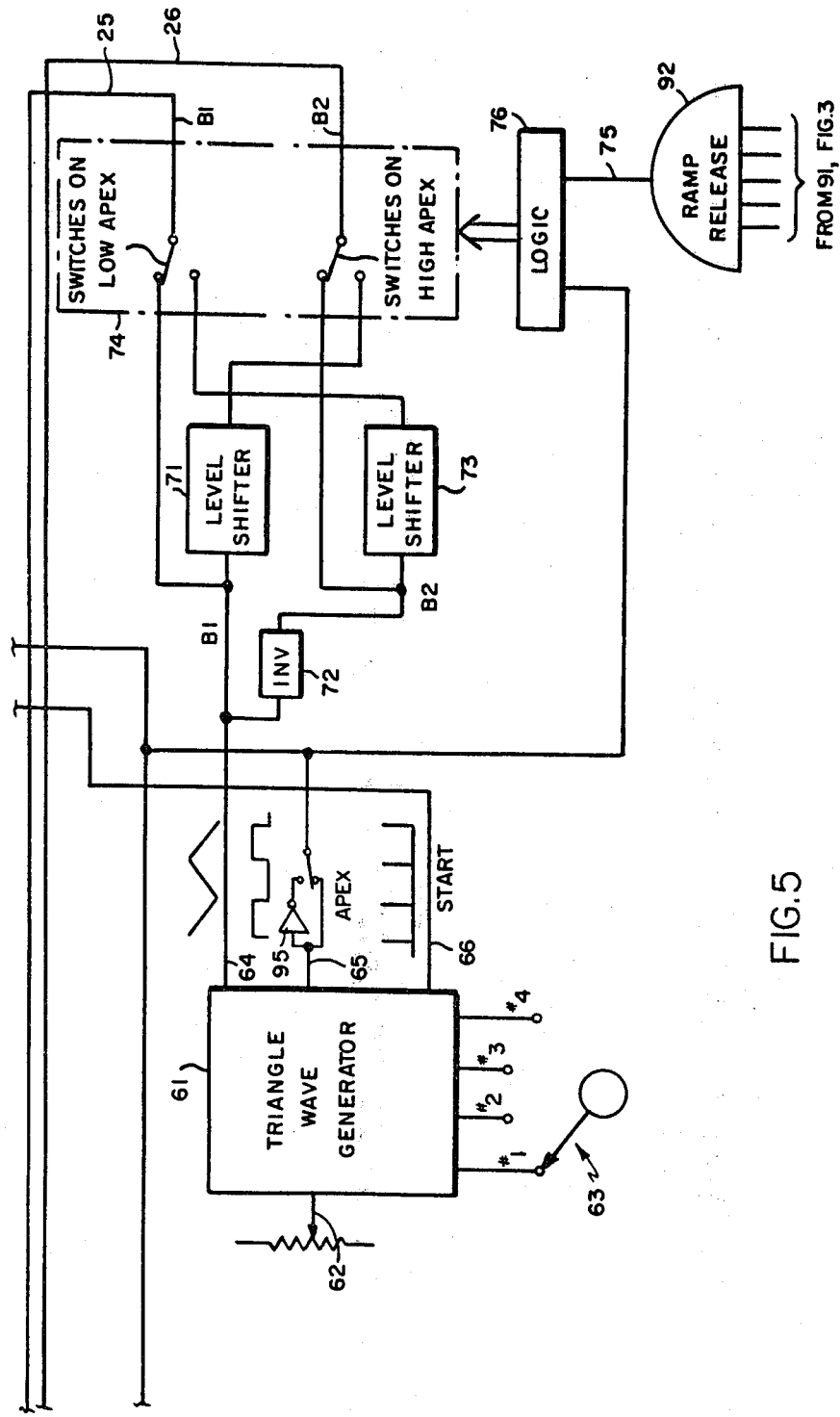
FIG. 5 is a block diagram of a sequencer system and triangle control section for controlling the systems of FIGS. 2 and 3.

The sequencer system and triangle control section are shown in FIG. 5 and will be described with reference to the waveforms of FIG. 7.

A triangular wave generator 61 has a pitch control input 62 which varies the slope of the trangular waves generated to select the pitch change in accordance with the previously cited Schiffman patents. A segment time selector 63 is also provided to provide different segment times for a given pitch control setting to tailor the keep and discard intervals for best performance. For example, going from #1 to #4 will increase keep and discard segments.

The output of triangular wave generator 61 is a triangular waveform on line 64. A squarewave synchronous therewith having low and high levels corresponding to the positive and negative slopes of the triangular wave on line 64 appears on line 65 and is referred to as the apex line since its transitions correspond to the high and low apex instants on the triangular wave. Also provided as an output on line 66 are start pulses generated at each apex or transition of the apex line.

The apex line 65 is applied in FIG. 3 to provide the D input to D-flip-flop 46. Also the start line 66 is applied to the S inputs of both D-flip-flops 36 and 46 in FIG. 3.

Figure 7:
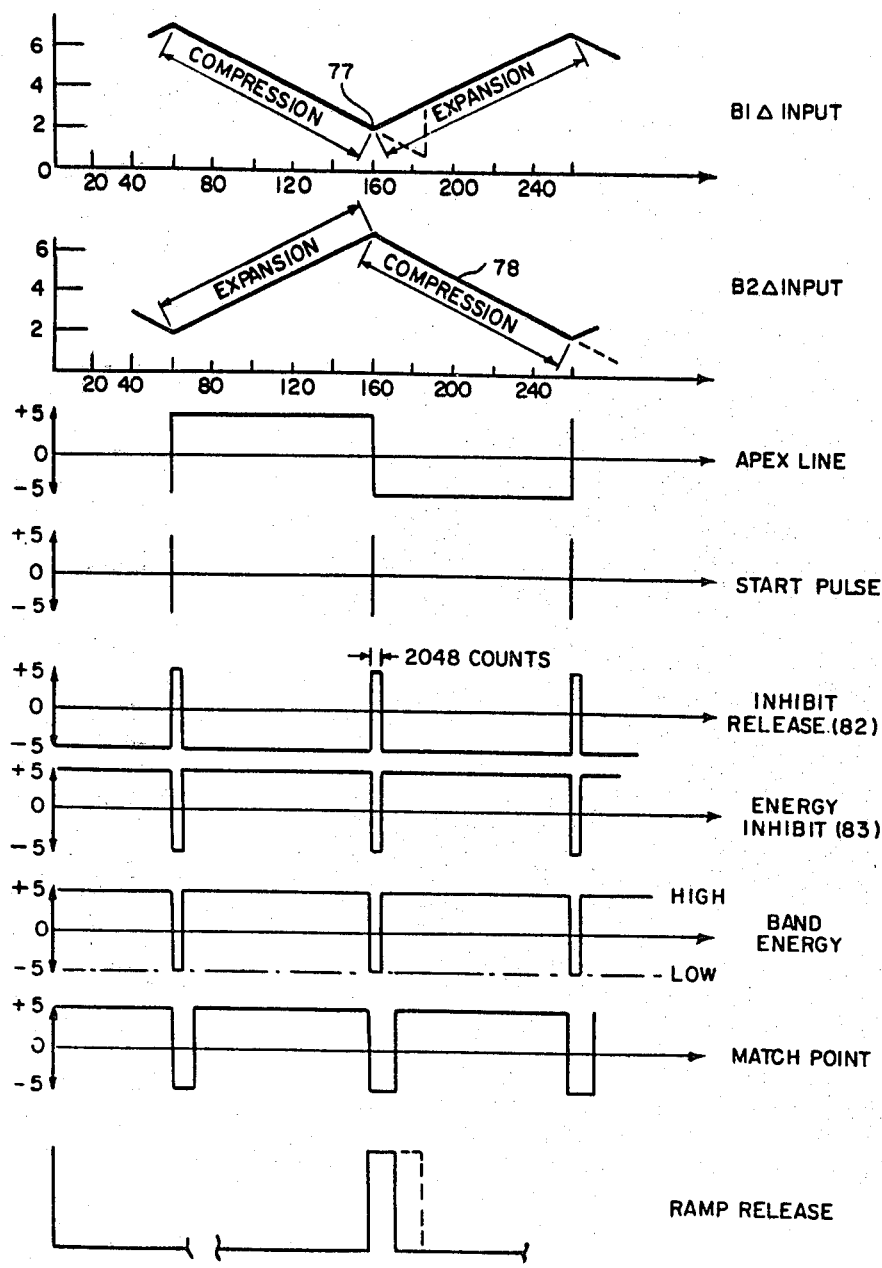
FIG. 7 shows waveform timing diagrams useful in explaining the operation and control of the system.

The triangular waveform on line 64 is used to derive the B1 and B2 triangular inputs shown in FIG. 7 which are applied respectively to terminals 25 and 26 of the pitch shifters shown in FIG. 2. The triangle wave on line 64 is connected to first level shifter 71 and, after passing through an inverter 72, to a second level shifter 73. The triangular wave on line 64 and the inversion thereof from the output of inverter 72 are applied to a switching device 74 which also receives the output of the level shifters 71 and 73. By means of the switching arrangement shown, the B1 and B2 triangle input signals for terminals 25 and 26 of the pitch shifters shown in FIG. 2 are obtained under the control of apex signal on line 65 and a ramp release signal on line 75. The apex and ramp release signals are used through logic unit 76 to control switching. From the switch positions shown, logic unit 76 controls the B1 output line 25 to switch from the line 64 to the output of the level shifter 73 whenever the apex line switches to low level; the B2 triangular output signal line 26 switches from the output of inverter 72 to the output of level shifter 71 whenever the apex line switches through a transition to high level. This sequence is shown in FIG. 7 where the B1 triangle input wave in compression reaches point 77 which is a transition of apex line from high to low and the compression rate is continued at the same pitch variation rate for a period of time until a match is found. To achieve this operation, switch 74 actually switches from line 64 to the compression portion of the B2 triangular input wave which has passed through level shifter 73 to match the amplitude level at point 77 for its initial amplitude. At the ramp release point, to be described in detail hereinafter, the switching unit 74 reverts to continue the same compression rate starting at point 78 on the compression variation slope of the B2 triangular input waveform. Of course, at the end of the B2 triangular input compression waveform a similar process occurs to obtain a match point for switching from the B2 audio back to the B1 audio.

The timing for this transition is obtained by a counter 81 shown in FIG. 2. Counter 81 is conditioned by an apex line transition to start counting and count the pulses on either the B1 or B2 clocks for 2048 counts. For the BBD's used in the pitch shifters 21 and 22, 2048 is the number of counts required to empty the contents in the BBD existing at transition and to fill the other pitch shifter BBD with signal subject to the compression rate. When the 2048 count is reached in counter 81 it produces an inhibit release output on line 82 and an energy inhibit output on line 83.

Inhibit time is defined as the interval for counting the 2048 counts in counter 81. When the inhibit release line 82 goes low at the end of the 2048 counts it enables the R input of the D-flip-flops 36 and 46 to pass data indicating match if such is found. At the same time the inhibit release occurs the energy inhibit goes high to enable an energy detector 84 (FIG. 3) to look for energy in the audio lines B1 and B2 from terminals 29 and 30. If no energy is available, meaning no signal present from which a match can be found, the output of energy detector 84 is applied to OR 47 to provide a forced match signal to the clock input of D-flip-flop 46. Thus, in the event of a pause or other absence of signal, the unit will function properly even though no match signals are available for detection by the circuit of FIG. 3. This output of OR 47 from line H or energy detector 84 is also applied to a ramp relese AND 92 to generate the ramp release waveform, FIG. 7, thereby reverting the switches 74 to the position shown at the instant switch 45 changes the audio output to the other pitch corrected output.

Figure 8:
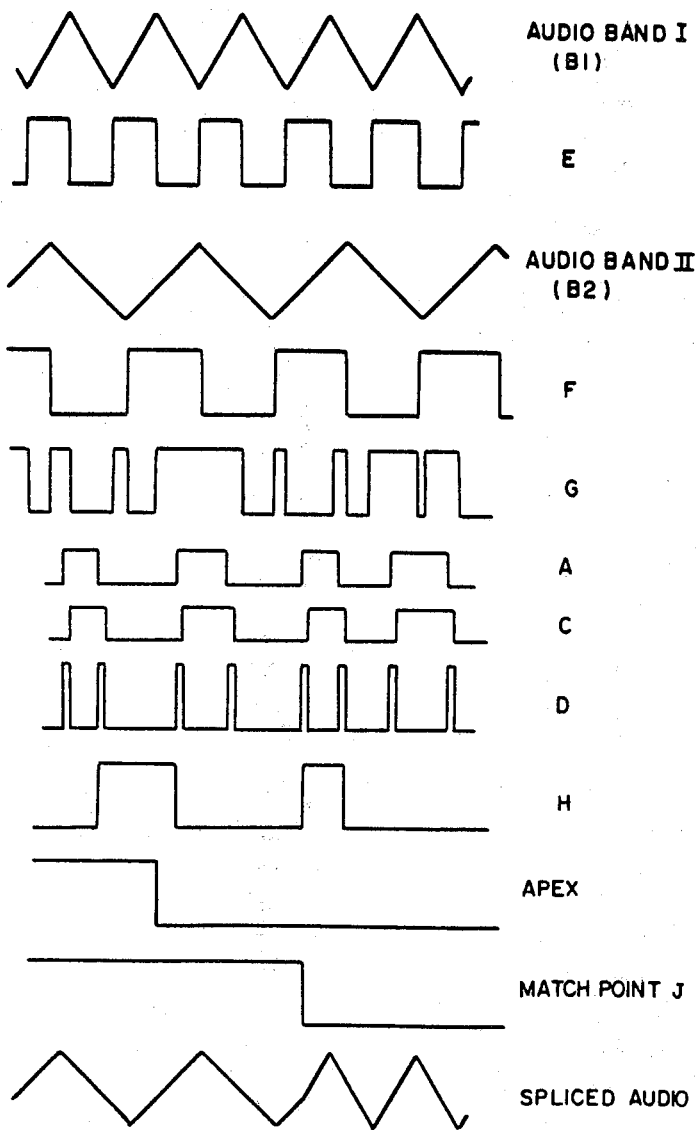
FIG. 8 is a waveform diagram showing the timing and control for splicing two audio waves in accordance with the invention.

In the terms of FIGS. 7 and 8, this switching sequence can be explained as follows. Pitch corrected AUDIO BAND I is passed to output 48 during "compression" of B1Δ INPUT until point 77 is reached. At LOW APEX the B1 switch 74 switches to the output of level shifter 73 which applies the inverted and level shifted EXPANSION portion of B1Δ INPUT to control the compression delay while slope and amplitude matches are found between B1 and B2 audio output (lines 29 and 30). When a match is found (or NO ENERGY PRESENT is detected) the RAMP RELEASE returns the switch 74 to the position shown and switch 45 interchanges the audio lines (29 and 30) to connect the B2 AUDIO BAND II to output line 48. On HIGH APEX an analogous process uses the B2 switch 74 to continue B2 AUDIO BAND II until a match is found to switch to B1 AUDIO BAND I. Note: In FIG. 8, the B1 and B2 audio signals are shown as triangle waves of different frequency to conveniently illustrate the spliced wave portions in the bottom line. These triangle audio signals are not the triangle control waves in FIG. 7 which are applied on lines 25 and 26 of the pitch shifters 21 and 22.)

Figure 9:
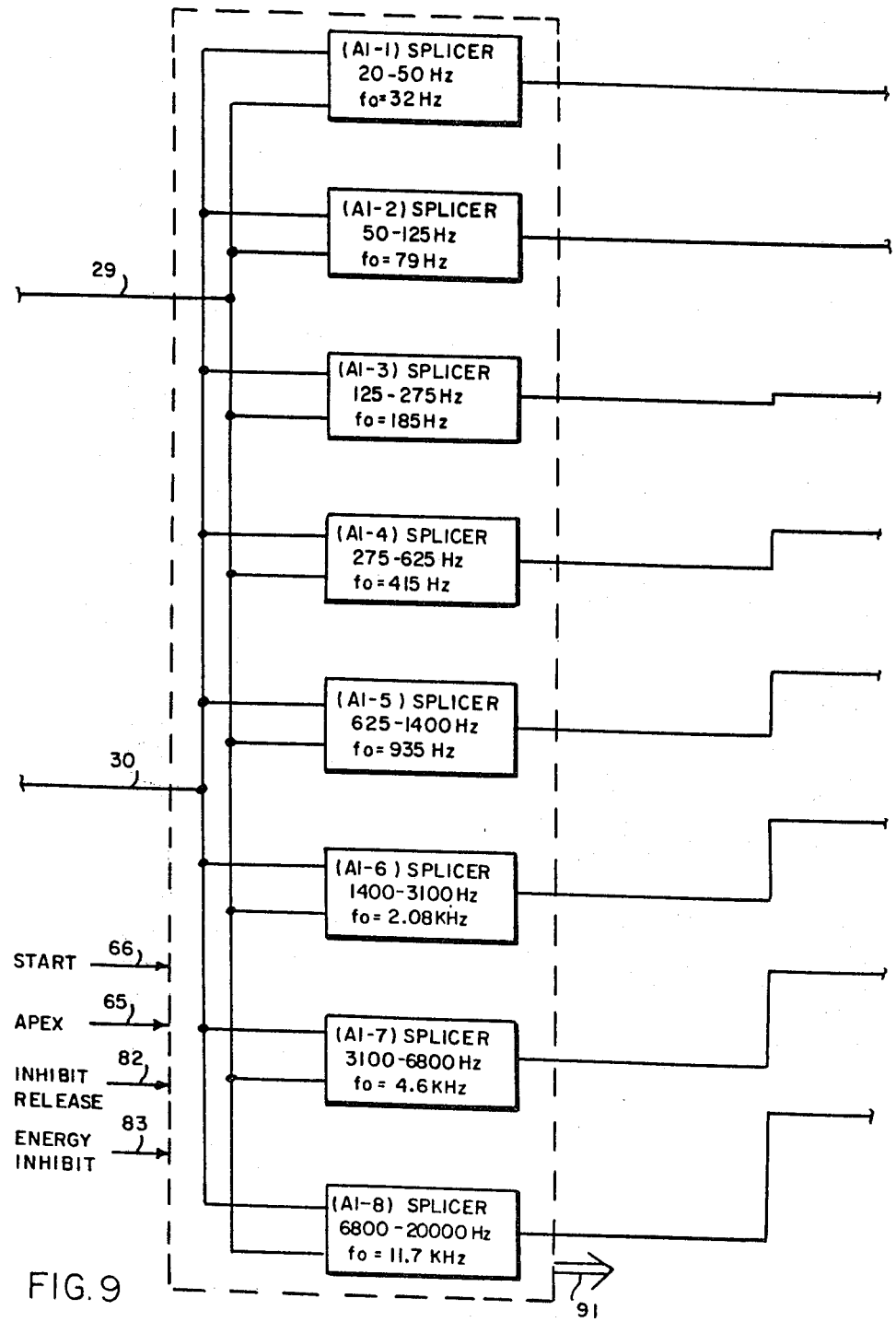
FIGS. 9 and 10 show a modification in which the pitch shifted signals are spliced and filtered in a plurality of frequency bands before being recombined to supply the composite audio signal to FIG. 4.
Figure 10:
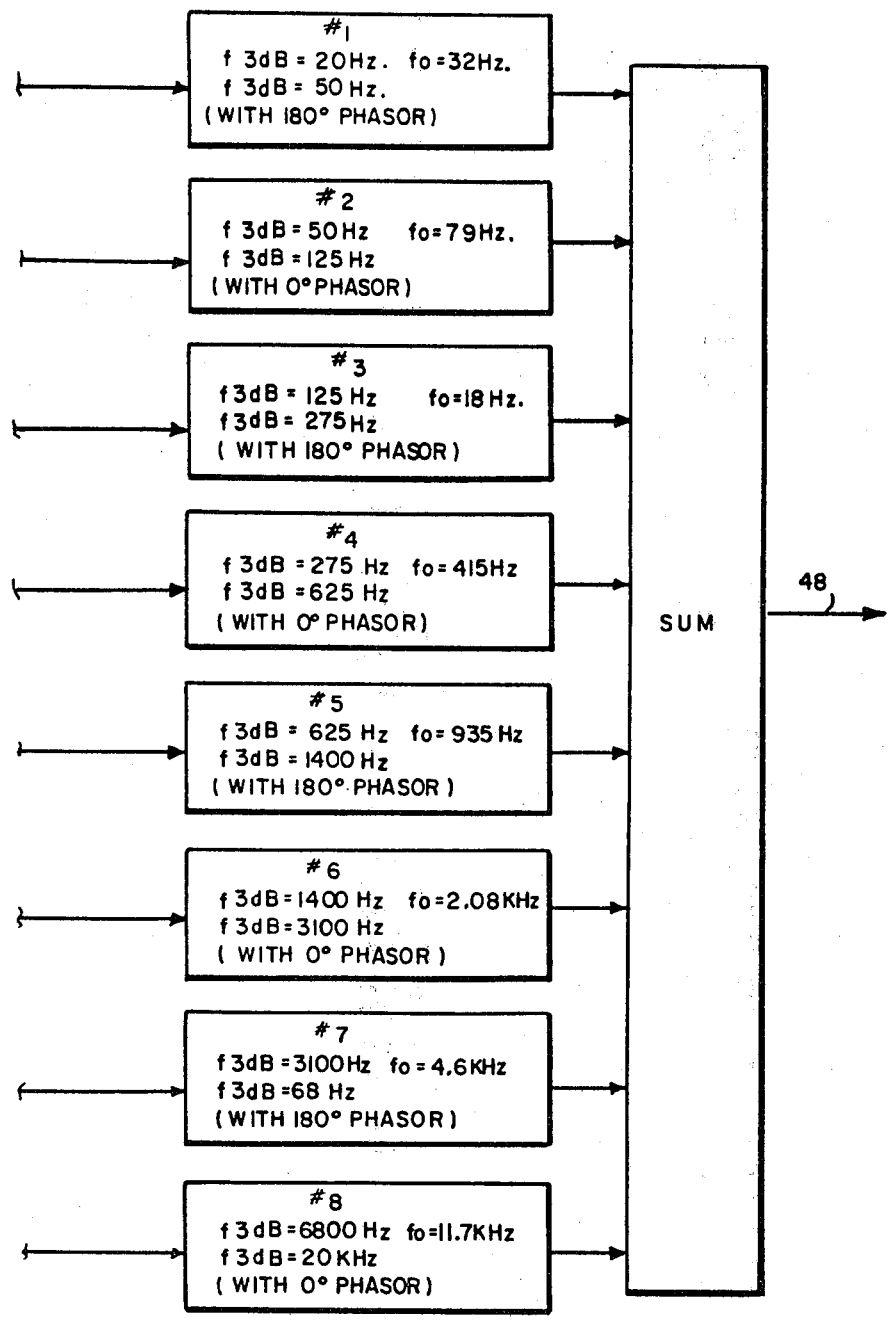

The foregoing description describes processing the audio signal in its full bandwidth as obtained from the input filter 11. For optimization of the splicing and reduction of intermodulation products an improved form of the invention employs band splitting for the signals that are applied to the splicer to establish a match. For this purpose as shown in FIG. 9, and 8-band splicer is shown with each splicer having input and output 8-pole Butterworth filters having their three db points and center frequency $f_0$ as indcted. Each of these bandpass filters is designed so that the percent bandwidths, i.e., the ratio of the actual passband width to $f_0$ is in approximately the range of 80% to 90%.

For example, for the lowest band filters in FIG. 9:

$f_0 = \sqrt{f_1 \cdot f_2} = 415 \text{Hz}$ $f_1 = 275 \text{Hz}$ $f_2 = 625 \text{Hz}$ $BW = 350 \text{Hz}$ $\% BW = 100 \times \frac{BW}{f_0} = \frac{350}{415} \times 100 = (80-90)\% \text{ (approx)}$ With this arrangement such band operates on relatively pure tones as compared to the complex waveform audio appearing on lines 29 and 30 of FIG. 2 and, accordingly, the splicing function can be optimized and inter-modulation products and other by-products of splicing minimized.

To optimize this signal processing each of the splicer's outputs is applied to a guard filter with the same passband and center frequency as shown in FIG. 9. These filters are third order Butterworth highpass and lowpass filters to provide the passband characteristic. In addition to the filtering function of the splicers of FIG. 9 hereinabove described, each of the splicers operates in the manner of the splicer shown and described in FIG. 3 to make an individual splice of the B1 and B2 audio waves or at least those portions which pass through the passband of the individual splicers. Since for this system the splices may not occur simultaneously, the outputs of the eight splicers indicated at line 91 in FIG. 3, are each applied to an AND circuit 92 in FIG. 5 such that all of the splices or forced matches have to occur for the eight splicers before a ramp release signal is applied on line 75. The criteria for the amplitude and sign match in the FIG. 3 circuits can be relaxed somewhat in this mode of operation because the audio signal in each channel is narrow band.

For expansion the system can operate on the opposite slope of the triangular waves B1 and B2 by introducing a signal inverter 95 in line 65 as shown in FIG. 5. This function, as shown, can be arranged to be switched in or out as needed if compression is changed to expansion or vice-versa. For small expansion factors this change is satisfactory but for large factors supplemental gap filling as disclosed in the prior art patents hereinbefore cited can be added, if desired.

Figure 11:
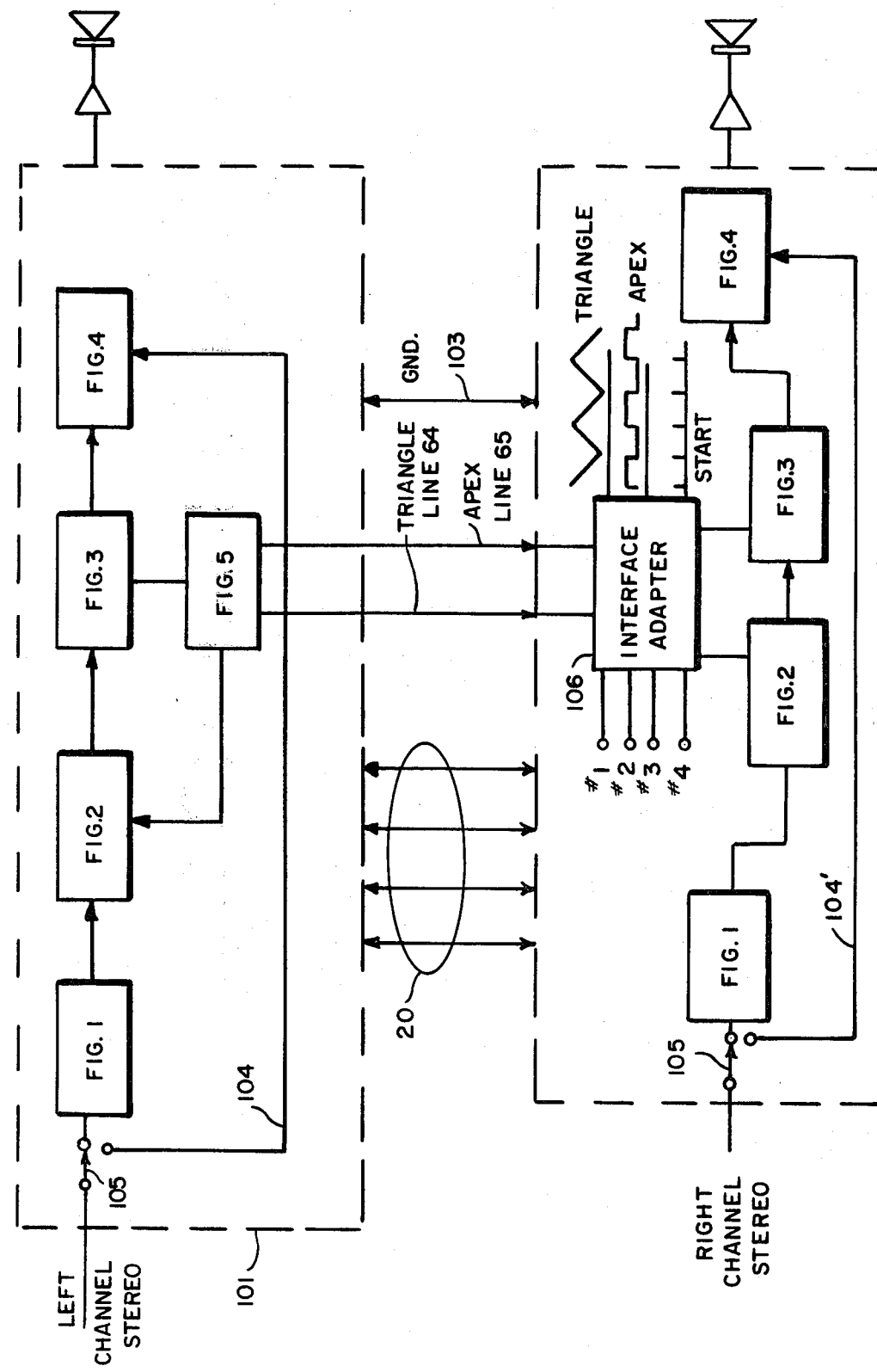
FIG. 11 is an overall block diagram showing the assembly of the system of the referenced copending application with a modified version thereof to provide stereo signal processing.

Referring to FIG. 11 the present invention will be described as a combination of the system disclosed in the aforementioned referenced patent application interconnected with a similar unit for a stereo reproduction.

In FIG. 11 the combination of the referenced patent application is represented within the rectangle 101 with cross-connections to the similar unit required for stereo enclosed within the rectangle 102. These cross-connections include the triangle line 64 and the apex line 65 a ground connection to make both units have common ground represented by line 103 and the four lines 20 which are connected selectively by the selector 63 of FIG. 5 of the referenced patent application for tailoring the pitch period to the particular characteristics of the signal for best results. A by-pass connection 104 is also made to permit the input signal to by-pass all the processing circuitry and appear at the output whenever time compression or expansion is not desired. For this purpose the unit 101 may be provided with a by-pass switch 105 schematically indicated as connected between the input and the output. A corresponding by-pass 104' and switch 105' are provided in unit 102.

The unit 102 is in all respects for FIGS. 1, 2, 3 and 4 like the unit 101 of the referenced application. The modification in unit 102 appears in an innerface adapter 106 which replaces the FIG. 5 unit of the referenced application. In this regard the innerface adapter 106 is essentially the same of FIG. 5 of the referenced application except that it operates in synchronism in response to the triangle line signals on line 64 and the apex line signal 65 to generate synchronous triangle wave apex and start signals as indicated. These signals are utilized by the units of FIGS. 2 and 3 in the same manner as the referenced application. The ramp waveform generated by the innerface adapter 106 has the same slope as that generated by the unit in FIG. 5 of the referenced application as controlled by selective adjustment 62 and the selection of the ramp period by unit 63 controls the signals on line 20 to adapt the lengths of the sample period in the innerface adapter 106 in like manner.

When units 101 and 102 are connected as indicated stereo operation is obtained with time compression in each stereo channel to provide accurate reproduction with noiseless splicing that maintains fixed stereo image location due to the synchronous timing of all corresponding signals elements in each channel despite the introduction of the time delay for pitch alteration. The resultant stereo signal pair is thus of broadcast quality and can be utilized for modulation of such signals as are taped for television stereo broadcasts of the highest quality.

Figure 12:
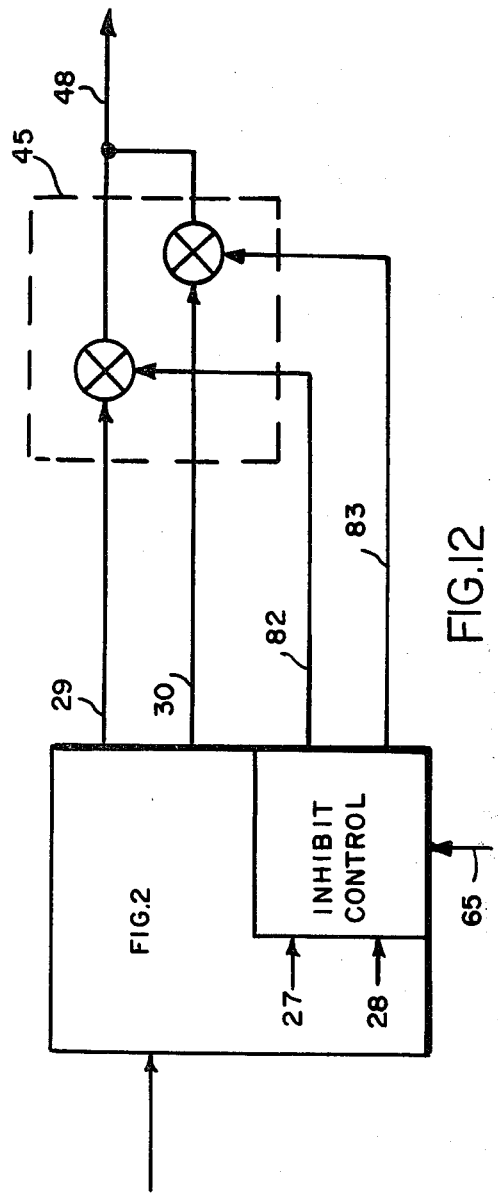
FIG. 12 is a partial block diagram of a modification showing simplified splicing.

FIG. 12 shows a modification of the system in which the amplitude and slope matching functions of FIG. 3 are eliminated. Such a system would be useful for more economical applications where the ultimate quality of completely noise free splicing in signal compression is not required. In FIG. 12 the pitch shifters of FIG. 2 supply the pitch altered signals on lines 29 and 30 as before which audio signals are applied to a pair of switches 45 to produce the continuous output signal on line 48 as described in the referenced application. The control for the switches 45, however, in FIG. 12 is derived directly from the inhibit control portion of FIG. 2 on lines 82 and 83. As described in the referenced application the inhibit control of FIG. 2 counts the clock pulses for B1 and B2 received on lines 27 and 28 and responds to apex level on line 65 to select which count is in progress. Thus the output on lines 82 and 83 will open the appropriate switch 45 at the appropriate time at the end of each triangular ramp delay analog for the selected condition of either compression or expansion. Thus the audio signals on lines 29 and 30 for the successive ramp analog delays will be combined directly on line 48 by the switches 45 without regard to amplitude or slope of the signals on line 29 and 30 which are combined. If desired the slope and amplitude matching system of FIG. 3 of the referenced application can be modified to provide the switching signals to switches 45 upon the occurrence of either amplitude match or slope match rather than upon the occurrence of both as disclosed in the referenced application. Such a modification would be an intermediate level of sophistication in obtaining a good match between the audio waveforms on lines 29 and 30 and could be obtained by merely supplying the fixed logic input corresponding to one or the other condition and letting the circuit respond to the occurrence of the other condition.

Figure 13:
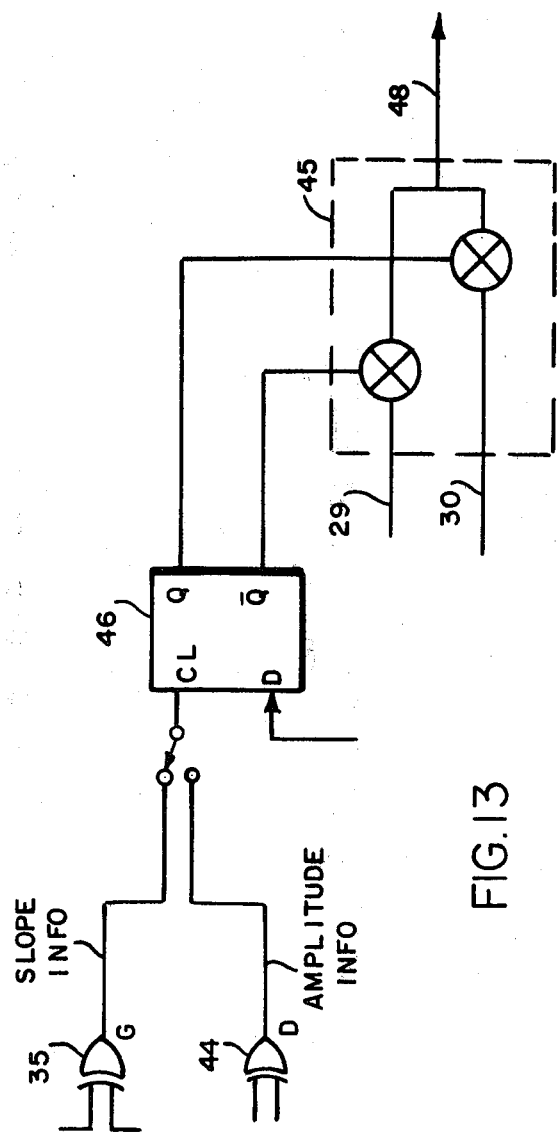
FIG. 13 is a partial block diagram of another modification.

The foregoing options are illustrated schematically in FIG. 13 where the switches 45 are operated from the flip-flop 46 on the Q and $\overline{Q}$ signals as described in the referenced application. D-flip-flop 46 has an input to its clock from either slope information, output G, of exclusive OR 35 or amplitude information output D of exclusive OR 44. Either input will tranfer the date on line D of flip-flop 46 for operation of switches 45.

Any modification of the invention will be apparant to those skilled in the art from the present teaching and the invention is not to be construed to be limited to the particular disclosed embodiment but only by the scope of the appended claims.

We claim:

1. A stereo time compression/expansion system in which the playback speed for a recording is selected such that the frequencies of electric signals derived from playback of a recorded work are different than their original values and said electric signals are processed to change their frequency by periodic variable time delay comprising:
   separate processing means for the audio signal for each stereo channel including for each channel:
   means for synchronously operating said separate processing means for both said stereo channels to obtain time coincidence between corresponding portions of the said substantially continuous pitch corrected output signal of each stereo channel;
   dual variable time delay means for variably delaying said playback signal in response to a control signal;
   control signal means for periodically varying said dual delay means inversely with alternate increasing and decreasing delay;
   switching means operable for alternately selecting the output of the delay means having the required pitch change during each period of delay variation; and
   means for combining the delayed signals detected by said switching means to provide a substantially continuous pitch corrected output signal.

2. Apparatus according to claim 1 and including:
   transition control means for operating said switching means after each variation period in response to detecting a signal level match between the just ending and next ensuing pitch corrected signal outputs of said dual delay means.

3. Apparatus according to claim 2 in which said transition control means includes means for operating said switching means a predetermined time after each said variation period in the absence of such operation in response to detection of a signal level match prior to said predetermined time.

4. Apparatus according to claim 1 and including:

transition control means for operating said switching means after each variation period in response to detecting a signal slope match between the just ending and the next ensuing pitch corrected signal outputs of said dual delay means.

5. Apparatus according to claim 4 in which said transition control means includes means for operating said switching means a predetermined time after each said variation period in the absence of such operation in response to detection of a signal slope match prior to said predetermined time.

6. Apparatus according to claim 1 and including:
transition control means for operating said switching means after each variation period in response to detecting a signal level and slope match between the just ending and next ensuing pitch corrected signal outputs of said dual delay means.

7. Apparatus according to claim 6 in which said transition control means includes means for operating said switching means a predetermined time after each said variation period in the absence of such operation in response to detection of a signal level match prior to said predetermined time.

8. A stereo time compression/expansion system in which the playback speed for a record is selected such that the frequencies of separate stereo channel electric signals derived from playback of a recorded work are different than their original values and said electric signals are processed to change their frequency by periodic variable time delay comprising:

means for deriving said stereo channel electric signals from said recorded work;

separate processing means for each stereo channel electric signal including for each channel:

first and second analog shift register means having said electric signals applied to the inputs thereof;

means for clocking said shift register means to delay signals shifted through said register means in accordance with phase opposed triangular wave delay analogs to provide repeated variation periods of opposite delay variation in the respective registers;

means operable for switching the outputs of said registers to apply one or the other pitch shifted output of said registers to an output terminal; and control means for operating said switching means after each said variation period to select the register output having the desired pitch shift to apply to said output terminal; and means for synchronously operating said separate processing means for both said stereo channels to obtain time coincident between corresponding portions of the selected register output supplied to said output terminal of each stereo channel.

* * * * *